United States Patent [19]

Chappell

[11] 4,274,880

[45] Jun. 23, 1981

[54] TREATMENT OF HAZARDOUS WASTE

[75] Inventor: Christopher L. Chappell, Lichfield, England

[73] Assignee: Stablex A.G., Zug, Switzerland

[21] Appl. No.: 89,410

[22] Filed: Oct. 30, 1979

[30] Foreign Application Priority Data

Nov. 8, 1978 [GB] United Kingdom ............... 43654/78

[51] Int. Cl.³ .............................................. C04B 7/35
[52] U.S. Cl. ...................................... 106/90; 106/97; 106/DIG. 1
[58] Field of Search ...................... 106/97, 90, DIG. 1

[56] References Cited

U.S. PATENT DOCUMENTS

| 4,113,504 | 9/1978 | Chen et al. | 106/97 |
| 4,116,705 | 9/1978 | Chappell | 106/DIG. 1 |

*Primary Examiner*—James Poer
*Attorney, Agent, or Firm*—Stevens, Davis, Miller & Mosher

[57] ABSTRACT

Oily wastes which are immiscible with water are treated by mixing them with powdered chalk or other absorbent substance and a liquid hazardous waste. The mixture thus obtained then has added to it cement and fly ash thereby producing a slurry which sets into a detoxified rock.

8 Claims, No Drawings

TREATMENT OF HAZARDOUS WASTE

The present invention concerns the treatment of hazardous waste produced by industry and commerce. It is an objective of the present invention to provide an improved process wherein liquid hazardous wastes, i.e. wastes in flowable form are converted to an impermeable solid.

A process in commercial operation for treating a liquid hazardous waste capable of being contained in an aqueous slurry comprises the steps of adding calcium-containing cement, preferably Portland cement powder and a powder consisting of aluminium silicate and/or an alumino-silicate, preferably fly ash, to the waste dissolved or dispersed in water thereby forming a flowable slurry containing the waste and allowing the slurry to set into a rigid rock like mass effectively a "synthetic rock". This process forms the subject of our British Pat. No. 1,485,625.

The present invention is concerned with the treatment of "oily" wastes, that is wastes containing oil, usually mineral oil and are thus immiscible with water and on their own not susceptible to conversion by the process set out above. Such oily wastes may also contain solids, fibres or toxic heavy metals which make them difficult or dangerous to dispose of by incineration.

In accordance with the present invention an "oily" waste of the kind set out above is mixed with a solid substance capable of absorbing or adsorbing the oil and a liquid hazardous waste capable of being treated by the process set out above.

A suitable absorbent solid substance is waste calcium carbonate powder but other finely divided solids such as Fuller's earth can be used.

The mixture of oily waste, solid substance and liquid hazardous waste then has added to it calcium-containing cement and aluminium silicate and/or aluminosilicate, preferably fly ash.

Substantial quantities of solid substance and liquid hazardous waste are required in admixture with the oily waste in order to produce a satisfactorily detoxified synthetic rock. Thus typically only from 5-50% by weight of oily waste is incorporated in the mixture prior to the addition of the cement and silicate. This will, however, depend on the oil content in the oily waste.

It is unexpected that the process in accordance with the invention should produce a satisfactory synthetic rock. It was predictable that the fly ash and cement particles would be coated with oil and the reaction between them to form the synthetic rock thus inhibited.

The following Examples illustrate the invention:

WASTE CLASSIFICATION

Oily Waste A

A brown oily liquid, largely immiscible with water, containing 85% mineral oil, 5% fatty matter, 1% ash on ignition at 800° C, and Zinc 68 ppm, Lead 20 ppm, Copper 13 ppm.

Oily Waste B

An oil and grinding sludge containing 3% mineral oil, 1.5% ash on ignition at 800° C., largely immiscible with water, also containing 0.5% iron and traces of toxic heavy metals.

Oily Waste C

Thick black oily sludge from drainage storage area of oil reclamation/distillation and refining works, which is immiscible with water, containing 70% extractable material (mainly mineral oil), 2.5% ash on ignition at 800° C., natural fibres and 240 ppm lead, 160 ppm Zinc, 4,800 ppm Iron, and 40 ppm Copper.

Oily Waste D

Black oily waste containing 15% ether extractable material (mainly oils), 34.1% ash on ignition at 800° C., 20 ppm Nickel, 72 ppm Zinc, 16 ppm Copper, 13 ppm Chromium.

Waste E (Solid Waste Substance)

Waste Calcium Carbonate (92%) in powder form containing 1% Manganese Dioxide and 6% water.

Liquid Hazardous Waste F

Liquid non-oily and non-organically contaminated waste containing 1% total toxic heavy metals including Copper, Chromium, Lead, Nickel and Zinc.

Liquid Hazardous Waste G

A neutral liquid waste produced from the neutralisation of waste diute hydrochloric acid with waste sodium hydroxide, containing 1.5% ash on ignition at 800° C. and no organic contamination or oil.

METHODS OF TESTING

Mobile Leaching Test 10 g of synthetic rock is ground to a fine powder in a pestle and mortar. It is mixed with 100 g of freshly distilled water in a PTFE vessel which is stirred magnetically using a PTFE coated magnetic follower for one hour. The contents of the vessel are allowed to settle for one hour and a visual observation made for the presence of free oil.

The supernatant liquid is poured into a PTFE centrifuge tube to separate any solids remaining in the supernatant liquid. The supernatant liquid is poured from the centrifuge test tube for testing for pollutant content.

Compression Strength and Permeability Testing

The permeability is measured by the method developed by E. Madgwick and described in Phil. Mag. S. 7 Vol. 13 No. 85, 1932, page 632. The compressive strength is measured by the method of British Standard 1610 in a Model A14 Clockhouse Triaxial Testing Machine (sold by Clockhouse Limited of New Barnet, Hertfordshire, England).

EXAMPLE I 1,100 g of Oily Waste A was mixed with 3,800 g of Liquid Hazardous Waste F and 4,800 g of Solid Waste Substance E. To this mixture was added 2,140 g of fly ash and 1,070 g of ordinary Portland cement and these were mixed in. There was 10.4% by weight of oily waste in the mixture prior to the addition of fly ash and Portland cement.

The slurry produced set into a hard synthetic rock in three days. The synthetic rock was subject to a mobile leaching test after ten days and the leachate was found not to contain any traces of oil and have a 4 hr. Permanganate Value of 15 mg/l. The synthetic rock has a compression strength of 210 psi at 28 days and a permeability of $2 \times 10^{-7}$ cms/sec.$^{-1}$ after ten days.

EXAMPLE II 1,000 g of Oily Waste B was mixed with 800 g of Liquid Hazardous Waste F and 1,800 g of Solid Waste Substance E. (28% by weight of oily waste in mixture). 960 g of fly ash and 240 g of ordinary Portland cement were added to the mixture and mixed in and the slurry produced had the following properties.

(a) Set into synthetic rock in two days.

(b) Mobile leaching test solution from rock did not contain any oil and had a 4 hr. Permanganate Value of 16 mg/l. This establishes a substantial absence of organic contaminants.

(c) Permeability of rock was found to be $1 \times 10^{-6}$ cms/sec.$^{-1}$.

(d) Compression strength of rock at seven days was 400 psi.

EXAMPLE III 1,000 g Oily Waste C was mixed with 3,000 g of Liquid Hazardous Waste F and 4,000 g of Solid Waste Substance E. (12.5% of oily waste in mixture) 1,800 g of fly ash and 900 g of ordinary Portland cement were added to give a slurry. Properties of the synthetic rock produced after the slurry had been allowed to set were as follows:

(a) Set in three days and had a compression strength of 150 psi at seven days and 350 psi at 28 days.

(b) The mobile leaching test solution did not contain any oil and had a 4 hr. Permanganate Value of 16 mg/l.

(c) The permeability was found to be $8 \times 10^{-8}$ cms/sec.$^{-1}$ after ten days.

EXAMPLE IV 1,000 g of Liquid Hazardous Waste D was mixed with 500 g of Liquid Hazardous Waste G and 1,000 g Solid Waste Substance E. The percentage by weight of oily waste in the mixture was 40%. To this mixture was added 560 g fly ash and 280 g ordinary Portland cement.

Summary of properties of synthetic rock produced from the slurry.

(a) It set in three days and had a compression strength of 580 psi at 28 days.

(b) The mobile leaching test solution contained no visible or detectable oil and had a 4 hr. Permanganate Value of 7 mg/l.

(c) The permeability was found to be $5 \times 10^{-7}$ cms/sec.$^{-1}$.

I claim:

1. A method of treating an oily waste which is immiscible with water characterised by the step of mixing the oily waste with a solid substance capable of absorbing or adsorbing oil and a liquid hazardous waste capable of being contained in an aqueous slurry and by the step of adding to the mixture a calcium-containing cement and aluminium silicate and/or an alumino-silicate thereby forming a flowable slurry which sets into a detoxified rock-like mass.

2. A method as claimed in claim 1 wherein the said solid substance is waste calcium carbonate.

3. A method as claimed in either claim 1 or claim 2 wherein the percentage by weight of oily waste in the mixture is between 5–50%.

4. A method as claimed in claim 1 or 2 wherein the aluminium silicate/alumino silicate component of the slurry is fly ash.

5. A method as claimed in claim 1 or 2 wherein the aluminium silicate/alumino silicate cement ratio is greater than 1:1.

6. A method as claimed in claim 3 wherein the aluminum silicate or alumino silicate component of the slurry is fly ash.

7. A method as claimed in claim 3 wherein the aluminum silicate or alumino silicate to cement ratio is greater than 1:1.

8. A method as claimed in claim 4 wherein the aluminum silicate or alumino silicate to cement ratio is greater than 1:1.

* * * * *